United States Patent [19]
Manor et al.

[11] Patent Number: 5,740,962
[45] Date of Patent: Apr. 21, 1998

[54] EQUIPMENT FOR SPRAYING OF PLANTS WITH A PLANT TREATING LIQUID INJECTED INTO TURBULENT PULSATING AIR STREAMS

[75] Inventors: Gedalyahu Manor, Haifa; Amos Geva, Kiryat-Tivon, both of Israel

[73] Assignee: Gedalyahu Manor, Haifa, Israel

[21] Appl. No.: 571,611

[22] Filed: Dec. 13, 1995

[51] Int. Cl.⁶ .................................................... B05B 1/20
[52] U.S. Cl. ...................... 239/77; 239/146; 239/172
[58] Field of Search ........................... 239/71, 73, 77, 239/146, 172, 166, 159

[56] References Cited

U.S. PATENT DOCUMENTS

| | | | |
|---|---|---|---|
| 2,977,715 | 4/1961 | Lindsay | 47/1.7 |
| 5,251,818 | 10/1993 | Manor et al. | 239/77 |

FOREIGN PATENT DOCUMENTS 2 607 029  5/1988  France.

*Primary Examiner*—Andres Kashnikow
*Assistant Examiner*—Lisa Ann Douglas
*Attorney, Agent, or Firm*—Frishauf, Holtz, Goodman, Langer & Chick, P.C.

[57] ABSTRACT

Equipment for spraying plants and trees with a plant treating liquid injected into turbulent pulsating air streams, including at least one oblong air outlet structure for issuing turbulent pulsating air streams in diverging directions. The air outlet structure has an oblong air inlet opening for receiving pressurized air and includes a plurality of longitudinally arranged air outlets extending outwardly from the air inlet opening. The air outlets each have a respective axis whose angle of inclination differs with respect to an angle of inclination of an adjacent air outlet. At least one spray nozzle is arranged to inject a plant treating liquid into the turbulent pulsating air streams issued from the air outlet structure.

38 Claims, 13 Drawing Sheets

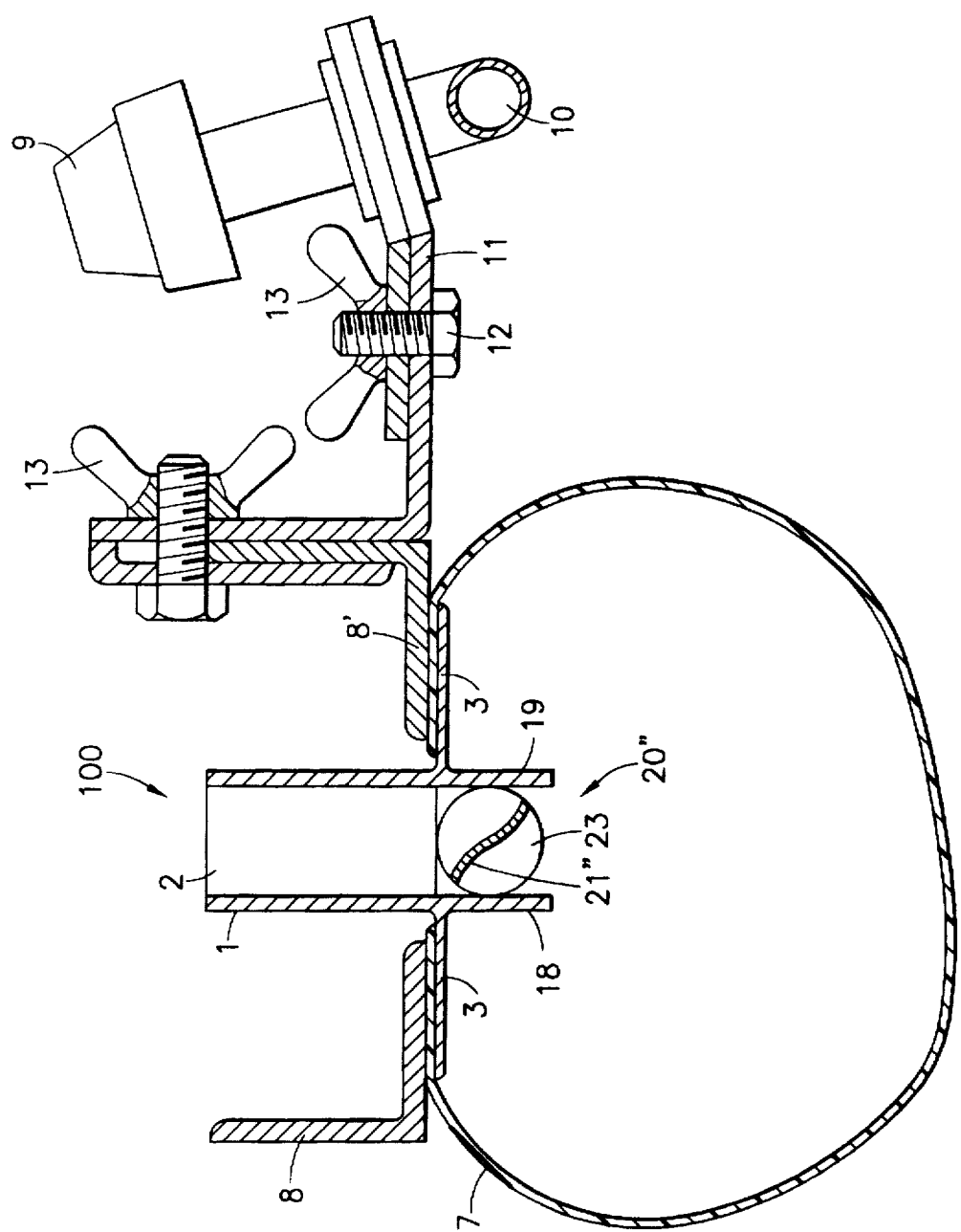

EQUIPMENT FOR SPRAYING OF PLANTS WITH A PLANT TREATING LIQUID INJECTED INTO TURBULENT PULSATING AIR STREAMS

The present invention relates to equipment for spraying plants and trees with the object of controlling insect pests and plant diseases. The present invention further relates to mobile equipment designed for spraying trees and other plants with insecticides and fungicides over their entire height while covering their entire leaf area with the sprayed liquid, with a view to keeping them healthy all over. The present invention still further relates to mobile equipment configured to travel along and over plants grown in parallel rows, serving to spray several rows simultaneously.

BACKGROUND OF THE INVENTION

Spraying of plants in parallel rows is generally carried out with the aid of mobile units which are provided with a plurality of spray nozzles mounted in vertical alignment to both sides of the plants to be sprayed. A typical example of this kind of equipment is disclosed in French Patent No. 2,607,029 (CALVET). It has also been found useful to spray plants by means of an air stream containing liquid crop treating material, as disclosed in U.S. Pat. No. 2,977,715 (LINDSAY).

However, in order to cover the plant leaves on all sides, it has been found necessary to shake and move the leaves by means of pulsating air streams which contain the treating material in a finely distributed state. The present inventors were also the inventors of spraying equipment including nozzles for directing pulsating air jets onto the sides of the plants, and nozzles for injecting liquid crop protecting material into the air jets, which equipment is disclosed in U.S. Pat. No. 5,251,818 (MANOR et al). The entire contents of U.S. Pat. No. 5,251,818 are incorporated herein by reference. The pulsating air streams in U.S. Pat. No. 5,251,818 cause the leaves to be in constant motion while being sprayed, resulting in their being covered by the liquid crop protecting material on both sides. Air ducts are each provided with two rotary propellers which are rotated by air flow in opposite rotation directions and which alternately open and close the ducts to cause air streams issuing therefrom to pulsate. Liquid spray nozzles are mounted close to the air ducts and inject liquid spray into the pulsating air streams which thus cover the leaves with finely distributed liquid particles. Such equipment has proved itself useful for spraying of plants and trees grown in parallel rows and is widely employed.

SUMMARY OF THE INVENTION

It is an object of the present invention to provide an improved spraying equipment of simple design, which can be manufactured from light weight plastic materials and which ejects turbulent pulsating air streams without requiring any moving parts.

It is a further object of the present invention to provide spraying equipment that is suitable for being mounted on any agricultural vehicle which is, in the usual manner, to be provided with an air blower for pressurizing air and a pump for pumping the liquid spray material.

It is a still further object of the present invention to provide spraying equipment having adjustable air outlet structures that can be adjusted to the contours of plants and trees and that can be maintained at a constant distance from the plants or trees being sprayed.

It is a yet further object of the present invention to provide spraying equipment having adjustable air outlet structures that can simultaneously spray several rows of low-growing plants or a row of relatively high fruit trees.

According to the present invention, equipment for spraying plants and trees with a plant treating liquid injected into turbulent pulsating air streams comprises at least one oblong air outlet structure for issuing turbulent pulsating air streams in diverging directions, said air outlet structure having an oblong air inlet opening for receiving pressurized air and including a plurality of longitudinally arranged air outlets extending outwardly from said air inlet opening, said air outlets each having a respective axis whose angle of inclination differs with respect to an angle of inclination of an adjacent air outlet; and at least one spray nozzle arranged to inject a plant treating liquid into the turbulent pulsating air streams issued from said air outlet structure.

BRIEF DESCRIPTION OF THE DRAWINGS

FIG. 1b is a section along line 1b—1b of FIG. 1a.

FIG. 9 is a sectional view, substantially identical with FIG. 8, except that the rotatable vane arrangement is shown mounted between extended side walls of the air outlet structure and upstream of the air outlets.

DETAILED DESCRIPTION

Figure 1A:
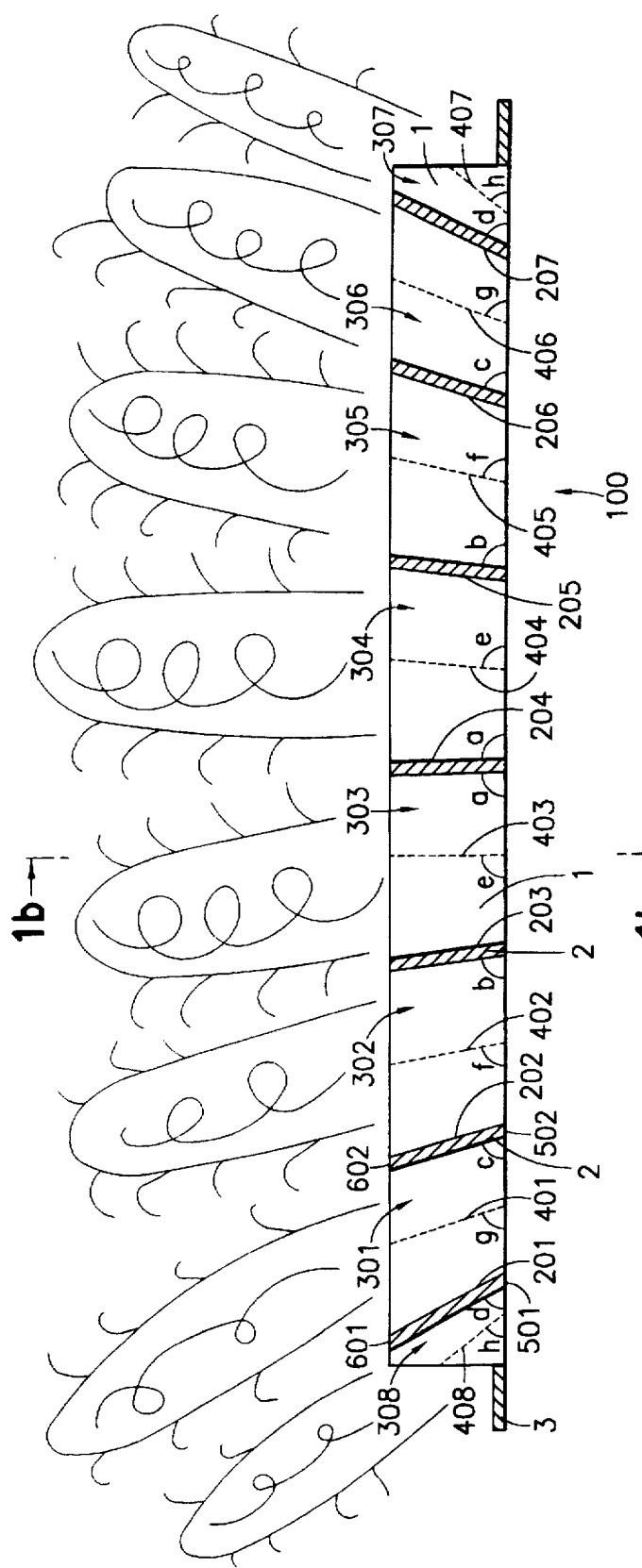
FIG. 1a is a longitudinal section, taken along line 1a—1a in FIG. 1b, of an air outlet structure showing air outlets emitting turbulent pulsating air streams from progressively endwardly inclined air outlets.
Figure 1B:
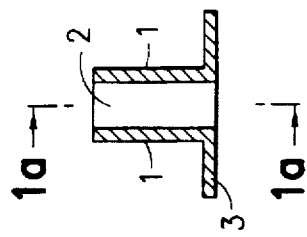
Figure 2:
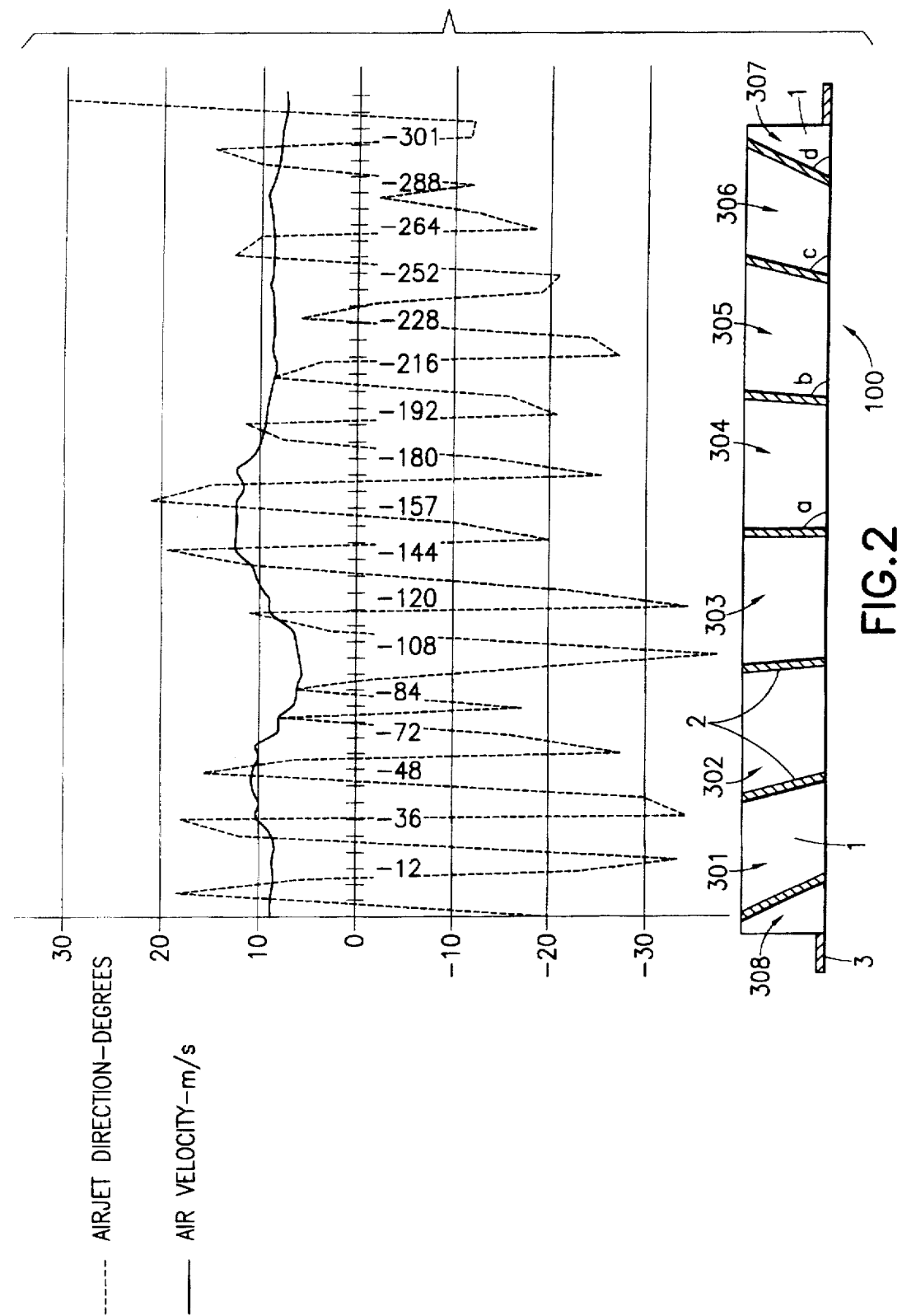
FIG. 2 shows the air outlet structure of FIG. 1a and a diagram of measured air velocities and air jet directions along the length of the entire air outlet structure.

FIGS. 1a, 1b and 2 show a preferred embodiment of an air outlet structure 100 according to the present invention. Turbulent pulsating air streams are issued from air outlets 303, 302, 301 which are of progressively greater endward inclination toward the left end of the outlet structure and which each have an increasing cross section from an air inlet side extending outwardly. That is, air outlet 301 is more leftwardly inclined than air outlet 302, which in turn is more leftwardly inclined than air outlet 303, and the cross section of air outlet 301, for example, increases from the air inlet side, where the cross section is defined by the distance between points 501 and 502, to the air outlet side, where the cross section is defined by the distance between points 601 and 602. Air outlets 304, 305, 306 similarly have progressively greater endward inclination toward the right end of the outlet structure 100, and each has an increasing cross section from an air inlet side extending outwardly. Due to the diverging direction of adjacent air streams and to diffuser action, whorls are created between each adjacent two air streams which effect substantially continuous change in flow direction (e.g., turbulence) and flow velocity (e.g., pulsation) as measured and recorded in FIG. 2.

FIGS. 1a and 1b show an outlet structure 100 which includes two parallel longitudinal side walls 1 and several partitions 2 connected between opposing side walls 1. A flange 3 surrounds an air inlet opening at the bottom of the structure. The flange 3 serves as a mounting flange to couple the air inlet opening to an air duct as will be described hereinbelow.

In the example shown in FIGS. 1a and 1b, seven partitions 201-207 extend between the opposed longitudinal side walls 1. The partitions 2 are progressively inclined toward the ends of the structure with respect to each other on both sides of a central upright partition as shown by progressively decreasing angles a, b, c, d. A central partition wall 204 is substantially perpendicular to the two longitudinal side walls 1 and partition walls 203, 202, 201 and 205, 206, 207 are progressively endwardly inclined at respective angles b, c, and d as shown in FIG. 1a. Angle a as shown in FIG. 1a is preferably about 90 degrees. The angles b, c, and d at which the partition walls are progressively endwardly inclined may decrease by increments of about 10 degrees, or in a range of from about 1–20 degrees, 6–30 degrees, and 15–45 degrees, respectively. For example, angles b, c, and d may be 80, 70 and 60 degrees, respectively. If an additional partition wall is provided on each end of the air outlet structure, the angle of inclination of such additional partition walls may decrease by a further increment of about 10 degrees, or in a range from about 20–60 degrees. If still further partition walls are provided, the angle of inclination of such further partition walls may decrease by further increments.

As shown in FIG. 1a, a row of air outlets each having respective axes 401–406 which are progressively endwardly inclined with respect to an adjacent air outlet is thus formed. End air outlets 307, 308 with respective axes 407, 408 are also provided. The axis of each air outlet is shown by a dotted line in FIG. 1a, and angles e–h indicate the angles of inclination of the axes, as shown in FIG. 1a. Specifically, the axis of a given air outlet (except the outermost air outlets 307, 308) is defined as a plane running between the two longitudinal side walls defining the air outlet at an angle to the central partition wall 204 that is about midway between the angle at which each of the adjacent partition walls defining such air outlet is inclined with respect to the central partition wall 204. For example, the air outlet defined by adjacent partition walls 205 and 206 has an axis 405 defined by a plane running between longitudinal side walls 1 at an angle f that is about midway between the angles b and c at which partition walls 205 and 206 are respectively inclined with respect to central partition wall 204. It should be noted that the respective outermost air outlets 307, 308 may be open on their ends and may be defined by just one partition wall, 207 and 201, respectively. In such case, the axis of each such outermost air outlet 307, 308 is defined by a plane running between longitudinal side walls 1 and an angle h that is about midway between 0 degrees and the angle d at which the outermost partition wall, 207 or 201, is formed with respect to the central partition wall 204.

As shown in FIG. 1a, the cross section of each air outlet increases extending outwardly from the air inlet opening on the air inlet side towards the open environment, as defined by the top of the outlet structure. For example, the cross section of air outlet 301 increases from the air inlet side, where the cross section is defined by the distance between points 501 and 502, to the air outlet side, where the cross section is defined by the distance between points 601 and 602.

Also as shown in FIG. 1a, the partition walls 2 separating each adjacent air outlet may also be spaced progressively closer together toward the respective outermost ends of the air outlet structure so that the cross section of successive adjacent air outlets decreases from the central portion of the air outlet structure to the respective outermost ends thereof. (See, for example, the decreased cross sections of outermost air outlets 408 and 407.)

Instead of providing the air outlet structure with air outlets each having respective axes which are progressively endwardly inclined with respect to the adjacent air outlet as shown in FIGS. 1a, 1b and 2, it is also possible to provide an air outlet structure having adjacent air outlets whose axes are endwardly inclined in opposing directions and/or at increasing and decreasing angles of inclination. That is, adjacent air outlets on each side of the air outlet structure may have axes that are endwardly inclined at increasing and decreasing angles of inclination in the same endward direction, and/or the air outlet structure may have adjacent air outlets whose axes are endwardly inclined in alternating endward directions. The critical feature is that the air outlet structure issues turbulent pulsating air streams in diverging directions.

Figure 3:
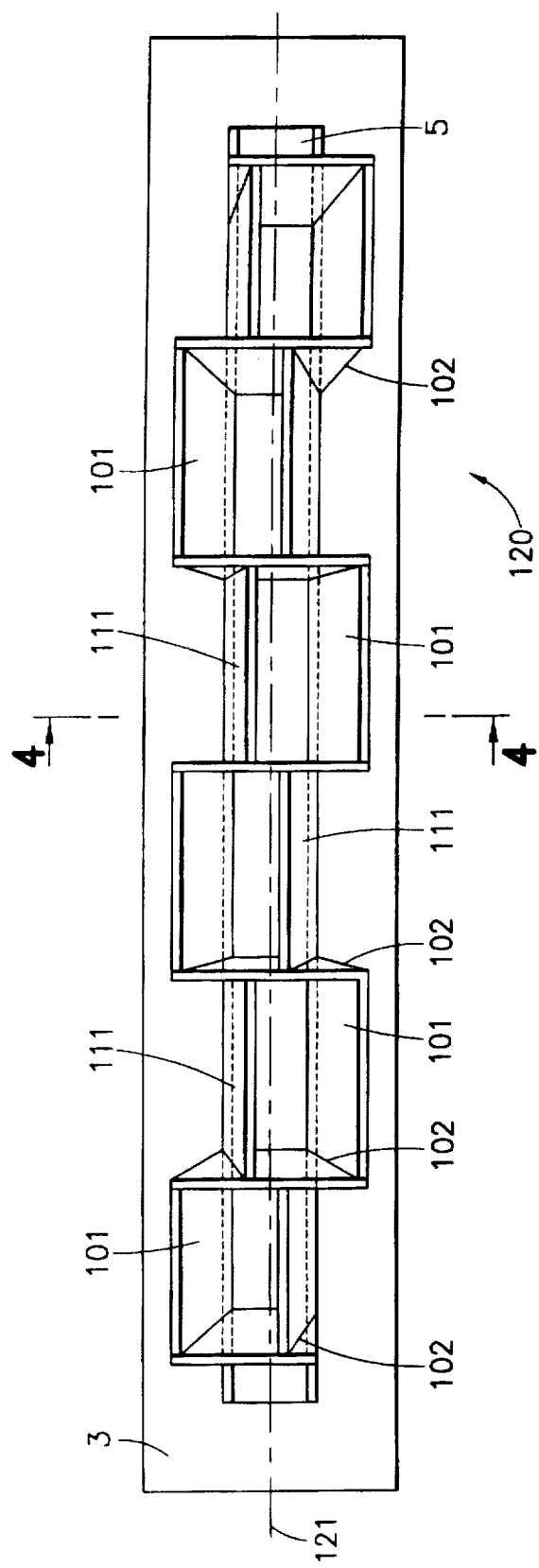
FIG. 3 is a top view of an air outlet structure including progressively inclined partitions and alternate outwardly inclined side wall portions.
Figure 4:
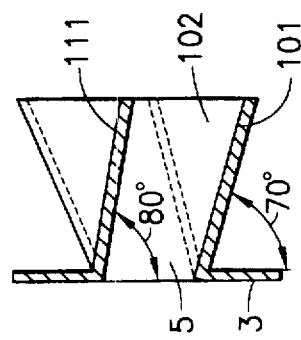
FIG. 4 is a section of the air outlet structure shown in FIG. 3 taken along line 4—4 in FIG. 3.

Still further, instead of providing the outlet structure with two parallel longitudinal side walls 1 (as shown in FIGS. 1a, 1b and 2) it is also possible to form the side walls in a "zigzag" fashion, as shown in FIGS. 3 and 4, thereby also extending the air outlets sideways in alternate order. The air outlet structure 120 shown in FIGS. 3 and 4 includes air outlets which, in addition to diverging from each other endwardly along the structure (as in FIG. 1a), extend sidewardly to the right and the left from a center line 121. The structure includes a rectangular oblong inlet opening 5 surrounded by a flange 3, progressively endwardly inclined transverse partitions 102 and pairs of longitudinal side wall portions 101 and 111 which are alternately inclined in opposite directions to the right and to the left from an imaginary center line 121, as shown in FIG. 4. Since the center line 121 extends horizontally in FIG. 4, the pairs of longitudinal side wall portions 101, 111 are alternately sidewardly inclined as seen in FIG. 4. In this embodiment, the air outlets are thus both endwardly and sidewardly inclined, causing the turbulence and pulsation of the emerging air streams to further increase.

As shown in FIG. 4, the sideward angles of inclination of the longitudinal sidewall portions 101 and longitudinal side wall portions 111 comprising each pair of longitudinal side wall portions may differ. For example, the sideward angle of inclination of longitudinal side wall portion 101 may be about 70° from the imaginary center line 121 and the sideward angle of inclination of longitudinal side wall portion 111 may be about 80° from the imaginary center line 121.

The air outlet structure of the present invention may be provided with a rotatable vane arrangement for controlling the rhythm of and for enhancing the pulsations of the turbulent pulsating air streams by successively alternately opening and closing each air outlet of the air outlet structure. The rotatable vane arrangement may be rotatably mounted in bearings at the two outermost ends of the air outlet structure, either positioned between the two longitudinal side walls or upstream of the longitudinal side walls. In order to prevent excessive speed of the rotatable vane arrangement, a speed controller, such as centrifugal speed controllers configured to brake the rotatable vane arrangement by friction, may be provided.

Figure 5:
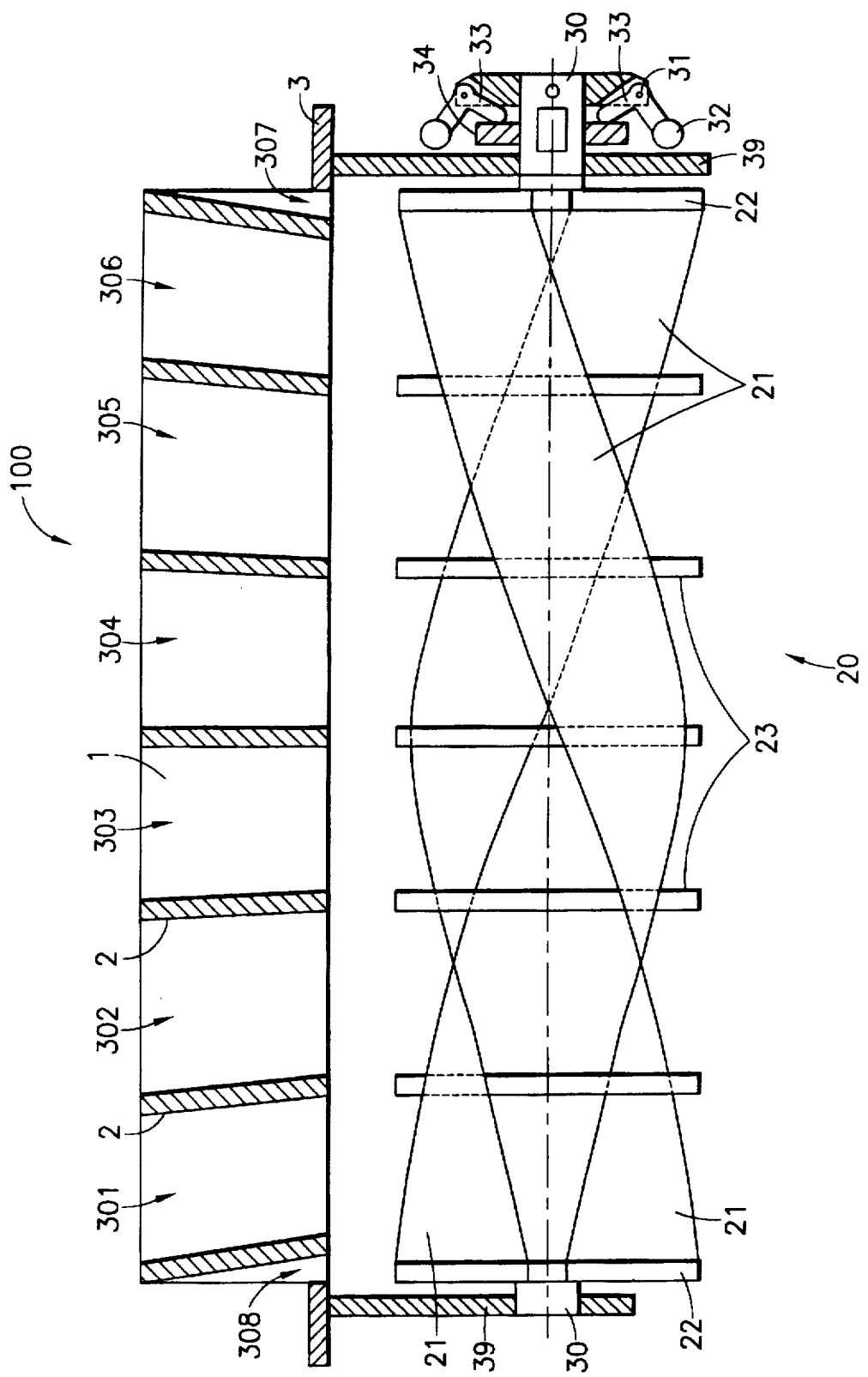
FIG. 5 is a section of the air outlet structure shown in FIGS. 1 and 2, with a rotatable vane arrangement attached thereto and arranged upstream of the air outlets.

FIG. 5 shows the air outlet structure shown in FIGS. 1a and 1b with a rotatable vane arrangement 20 of a length co-extensive with that of the air outlet structure and which is rotatably mounted upstream of the air outlet structure in two end walls 39 extending from flange 3. The rotatable vane arrangement 20 includes two blades or vanes 21 which are helically wound (or twisted) from end to end and held by circular end plates 22 and intermediate plates 23. These vanes 21, while rotating, partly and progressively obstruct and free the air outlets to control the rhythm of and enhance strength of the pulsations of the turbulent pulsating air streams issued from the air outlet structure. The rotatable vane arrangement 20 may also be mounted on the air outlet structure shown in FIGS. 3 and 4. FIG. 5 also shows a centrifugal controller mounted on a shaft 30 at the right end of the rotatable vane arrangement 20, which, in a known manner, brakes the rotating unit to prevent excessively high speed rotation by means of flyweights 32 urging a rotating friction plate 34 onto the stationary end wall 39 by means of fingers 33.

The pulsations of the air streams may also be enhanced and rhythmically controlled by various other mechanisms, including those disclosed in the aforementioned U.S. Pat. No. 5,251,818, which is incorporated herein by reference.

Where it is desired to spray different kinds and sizes of plants and trees, the air outlet structures according to the present invention may be attached to a flexible duct in a continuous arrangement and may be connected to each other by hinges permitting angular displacement relative to each other. In such a case, the ducts are also preferably provided with foldable joints (as described hereinbelow) opposite the hinged connections, allowing the flexible ducts to be bent into a shape around the contours of a plant or tree to be treated with a plant treating liquid or the like. Where it is desired to spray between rows of heavy foliage, on the other hand, the air outlet structures according to the present invention may be mounted on rigid ducts so as to be able to cut through the heavy foliage between the rows being sprayed.

Figure 6:
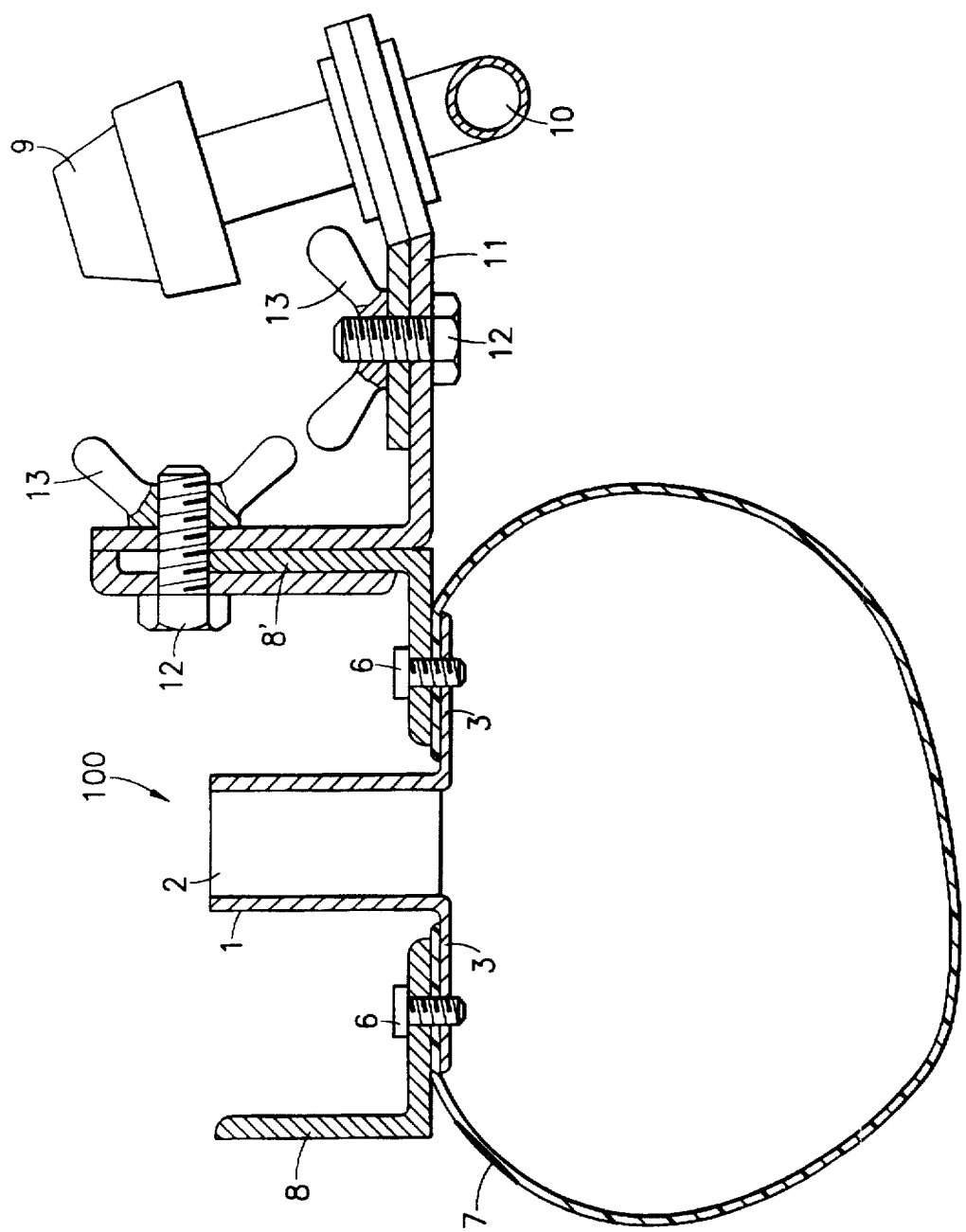
FIG. 6 is a cross section through a flexible duct and an air outlet, also showing a spray nozzle fixed to the air outlet structure.

FIG. 6 shows a cross section of a flexible air duct 7, with an air outlet structure 100 and a spray nozzle 9 connected to the duct 7. The flange 3 of the air outlet structure 100 is connected to the duct 7 by means of brackets 8 and 8' and bolts or rivets 6. The spray nozzle 9 communicates with a supply of plant treating liquid by a pipe 10 and is connected to bracket 8' by a rigid structure 11. The rigid structure 11 is configured to permit angular and spatial adjustment of the nozzle 9 with the aid of screws and wing nuts 12 and 13 to permit the liquid spray from nozzle 9 to be directed into the air streams (shown in FIG. 1a) issuing from the air outlet structure 100. It should be understood that the nozzle 9 may be provided outside and adjacent to the air outlet structure 100, as shown in the preferred arrangement of FIG. 6, and that the nozzle 9 may also be provided inside the air outlet structure 100.

Figure 15:
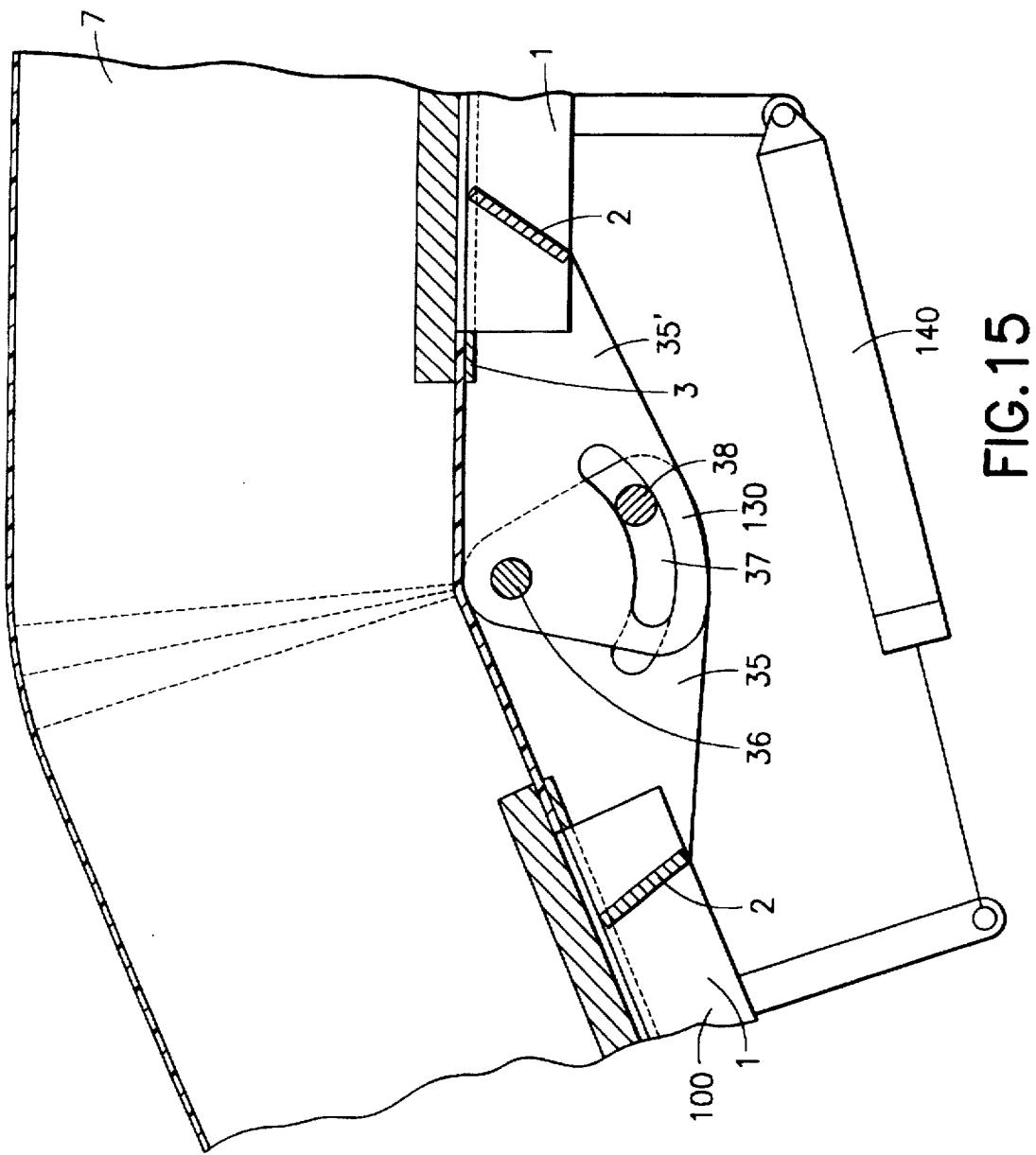
FIG. 15 shows a hinged connection of two air outlet structures.
Figure 16:
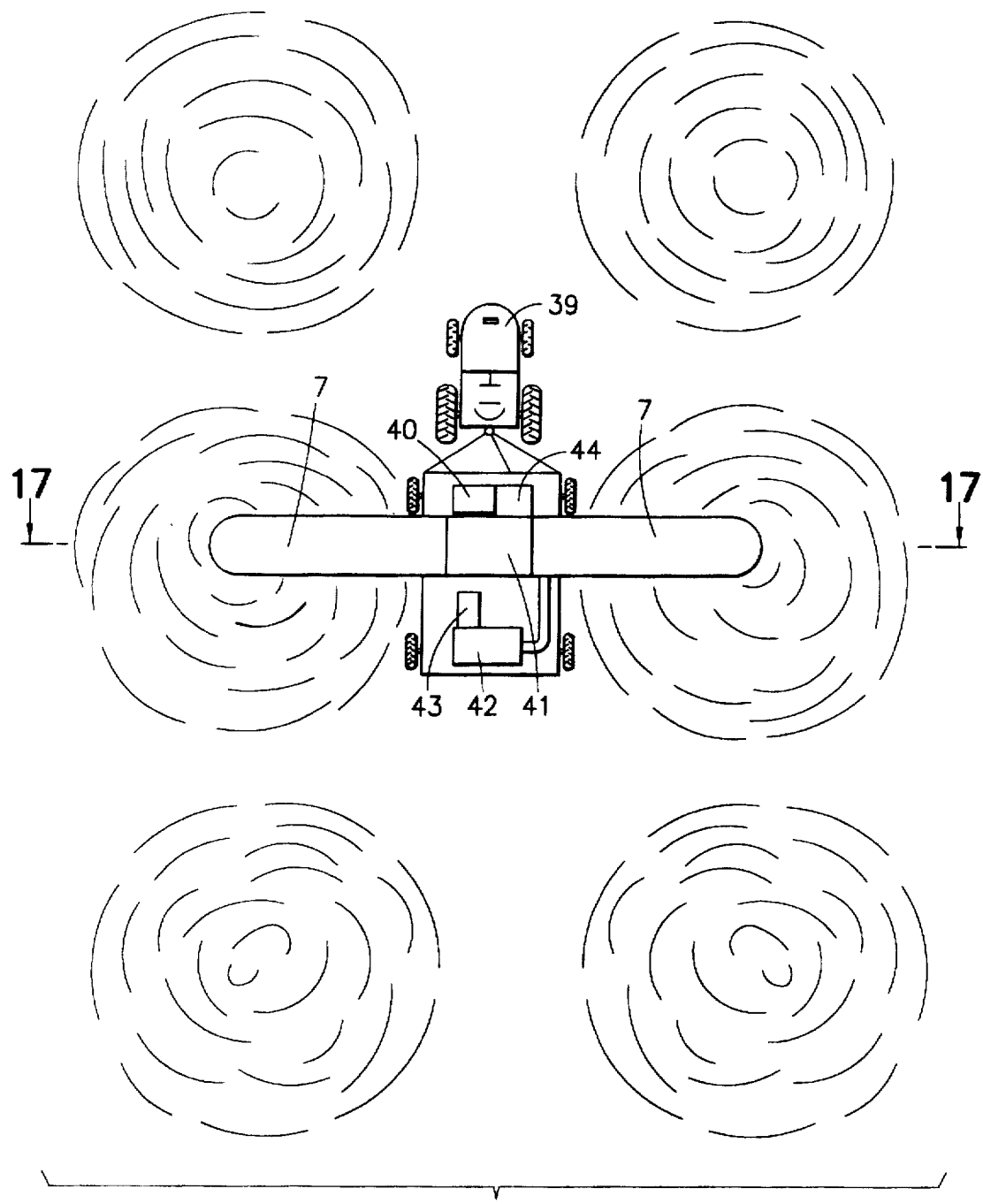
FIG. 16 shows an agricultural vehicle equipped with the spraying equipment of the present invention.

The air ducts 7 may be in the form of an expandable flexible plastic material, such as a plastic air bag (preferably reinforced vinyl), to which several air outlet structures 100 are attached in adjoining alignment (as shown in FIG. 15), which permits folding of the duct sections into various arbitrary shapes in accordance with the contour of the plants or trees to be sprayed. It will, however, be understood that the ducts 7 may likewise be made of solid material such as of solid plastic or metal sheeting; however ducts made of soft flexible plastic material in the form of a flexible hose of large diameter are less costly and light in weight, are readily bent into a desired shape, are relatively easy to repair, and are resistant to the influence of inclement weather.

Figures 7, 8:
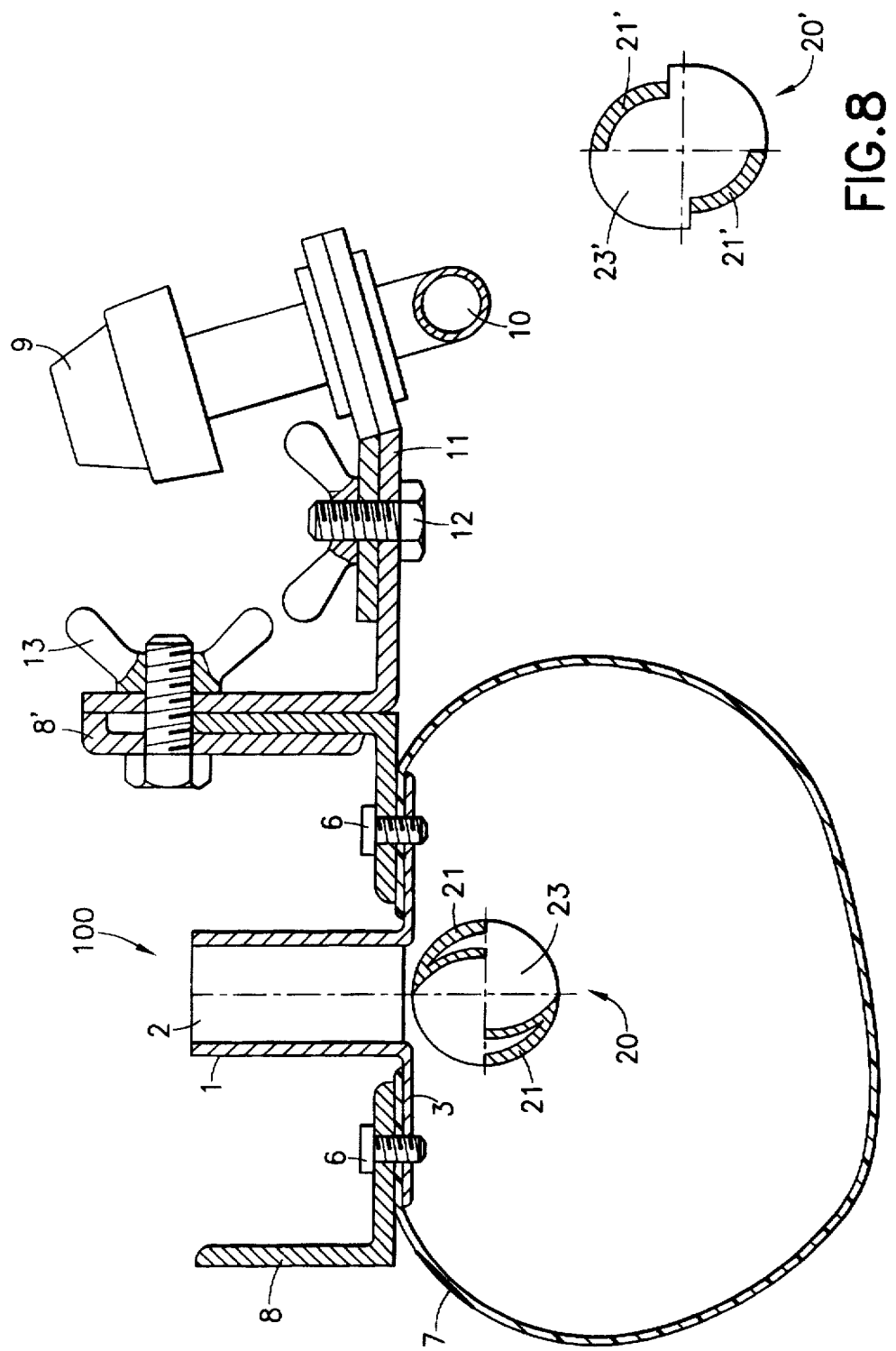
FIG. 7 is a cross section through a flexible duct and through a straight air outlet similar to that shown in FIG. 6, also showing a two-bladed rotatable vane arrangement mounted upstream of the air outlets as shown in FIG. 5.
FIG. 8 is a cross section of a rotatable vane arrangement of a different configuration.
Figure 10:
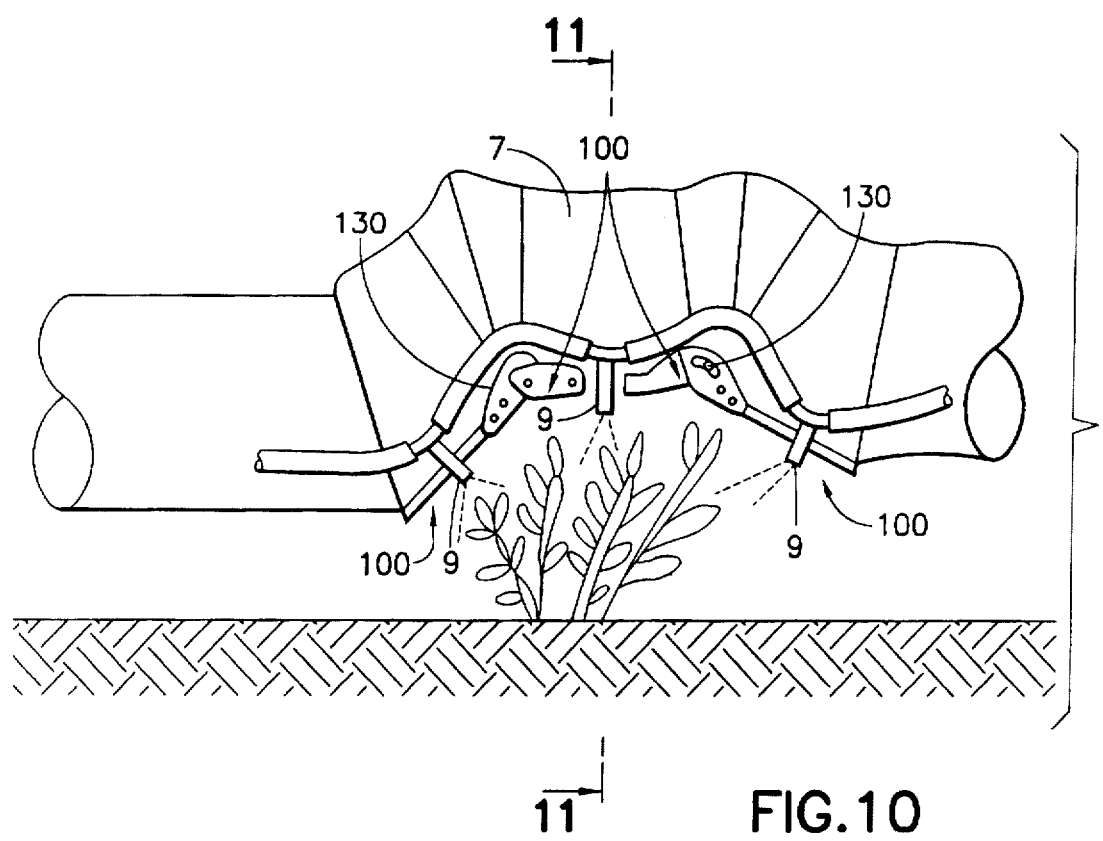
FIG. 10 is a side view of spraying equipment arranged in a bow-shape surrounding the top of plants.
Figure 11:
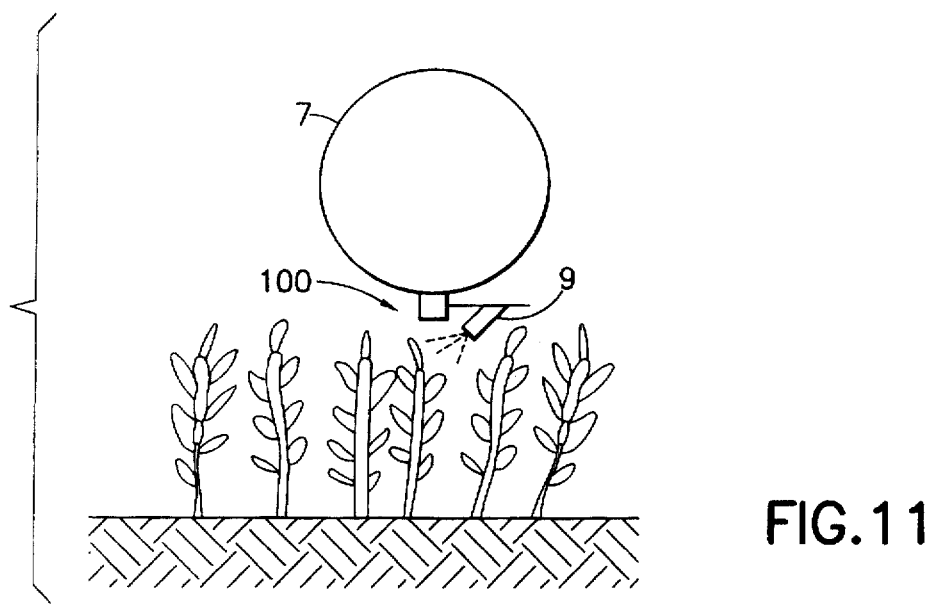
FIG. 11 is a section along line 11—11 of FIG. 10.
Figure 13:
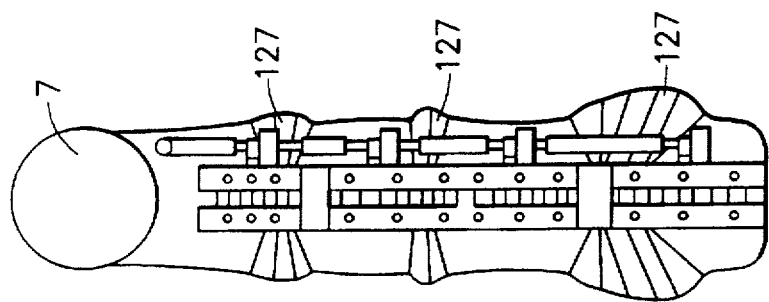
FIG. 13 is a section along line 13—13 of FIG. 12.

FIG. 7 is a section of an air duct 7, an air outlet structure 100 and a nozzle arrangement 9 substantially identical with that shown in FIG. 6, with the addition of a rotatable vane arrangement 20 rotatably mounted close to and upstream of the air outlet structure 100, in a manner as shown in FIG. 5.

FIG. 8 shows another embodiment of a rotatable vane arrangement 20' in cross section with two blades 21' close to the circumference thereof and with intermediate plates 23' shaped in accordance with blades 21'.

FIG. 9 shows a rotatable vane arrangement 20" with a blade 21" of S-shaped cross section positioned between two longitudinal side walls 18 and 19 of the air outlet structure 100, which walls 18 and 19, for this purpose, are elongated and extended into the interior of the duct 7. It can be visualized that during each full rotation, the rotatable vane arrangement 20" completely opens and closes one air outlet after another. To the contrary, the rotatable vane arranged 20", as well as the rotatable vane arrangements 20 and 20' respectively shown in FIGS. 7 and 8, obstruct the air outlets only in part, thereby causing the air streams to pulsate at the rhythm of the rotatable vane arrangement rotations.

FIGS. 10 through 14 show various embodiments of the spraying equipment which permit spraying of trees and plants by bending the flexible duct 7 into various shapes to adjust to the contours of respective plants or trees. It should be understood that the air outlet structures 100 connected to the duct 7 can be bent individually or in varying combinations by controlling the angular alignments therebetween.

Figure 12:
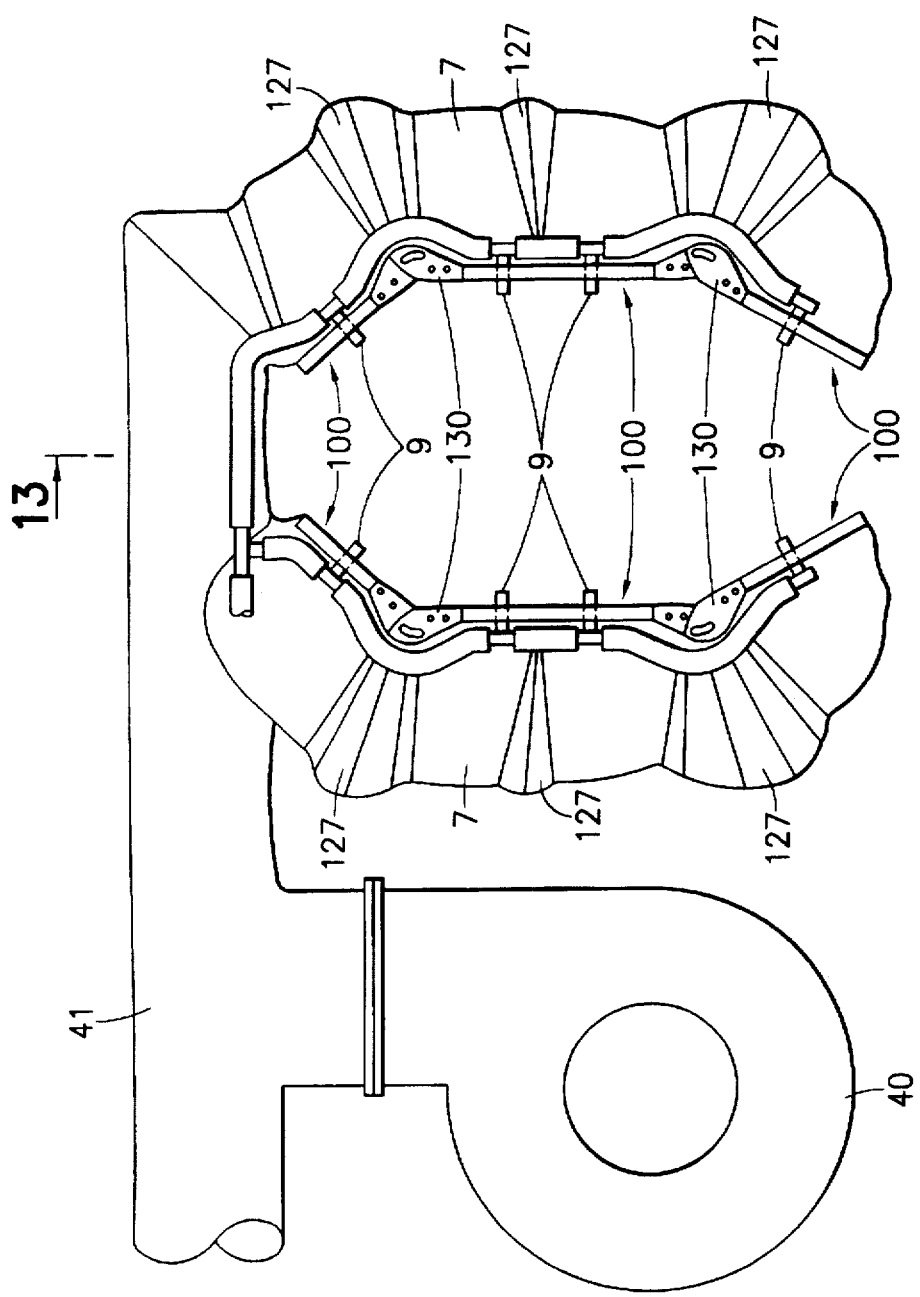
FIG. 12 is a side view of spraying equipment arranged in a U-shape to surround a tree, such as a fruit tree, on all sides.
Figure 14:
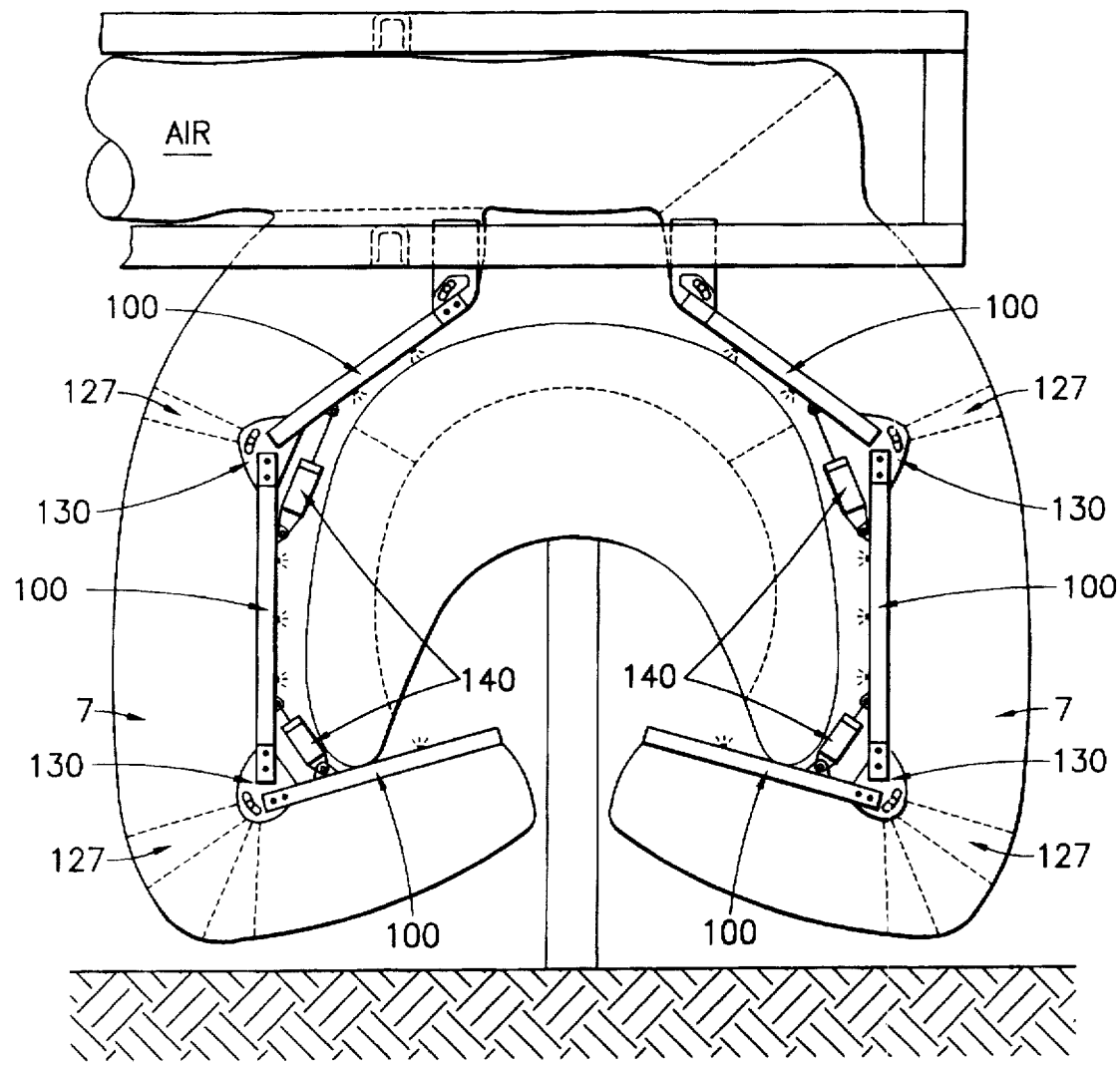
FIG. 14 is a side view of spraying equipment bent to surround a tree on its sides and below the leaves of the tree.
Figure 17:
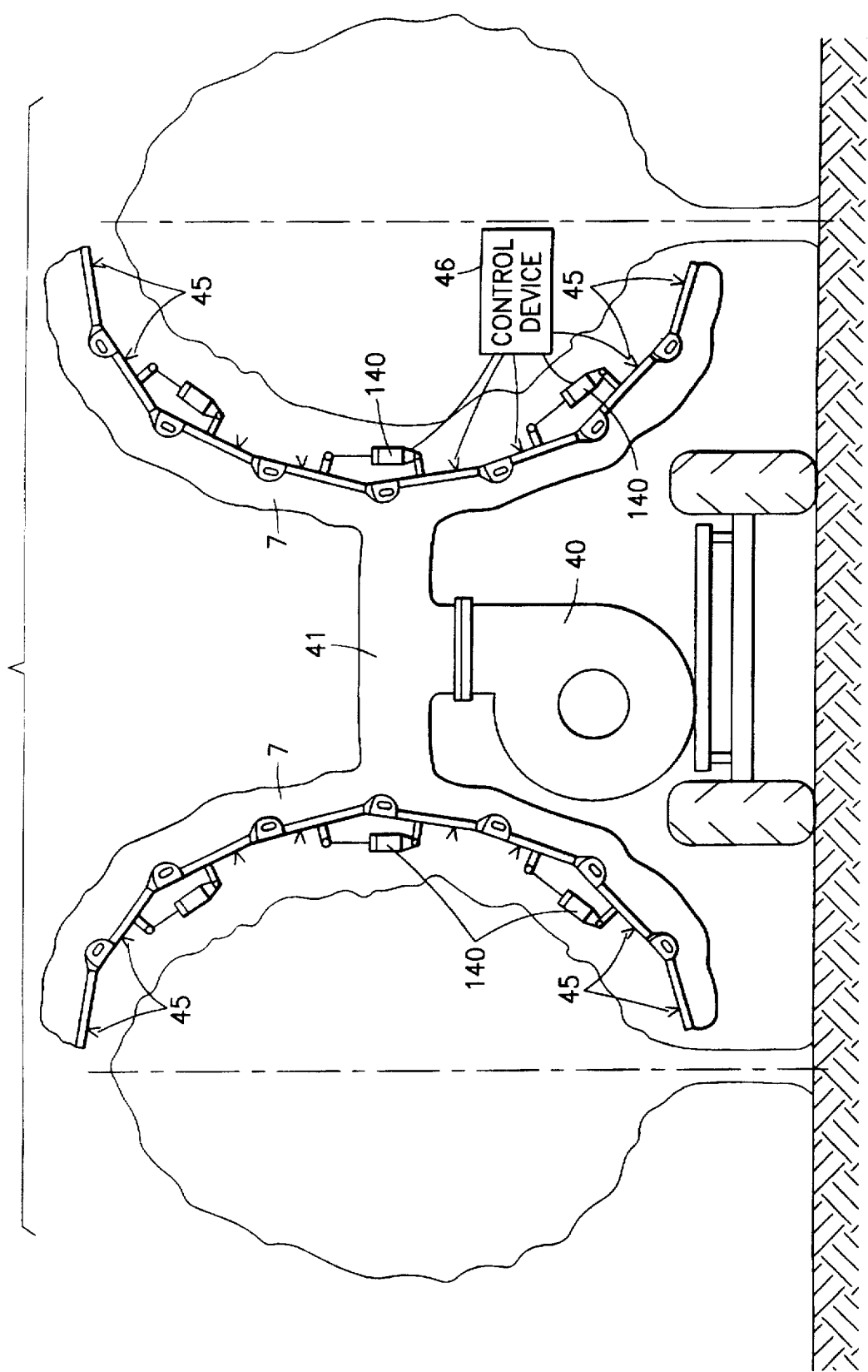
FIG. 17 shows a schematic sectional view of the agricultural vehicle equipped with the spraying equipment of the present invention shown in FIG. 16.

FIGS. 12, 14, and 15 show hinge arrangements 130 for connecting the air outlet structures 100. As shown in FIG. 12, the air ducts 7 have foldable joints (or pleated sections) 127 at portions thereof opposite or near the hinge arrangements 130 to provide more flexibility and ease of adjustment thereof. As shown in FIGS. 14 and 15, a controller 140, such as a hydraulic piston or an electrically powered linear actuator having two arms, is provided between adjacent air outlet structures 100 to control the angular alignment therebetween, either manually or automatically, so as to maintain the air outlet structures 100 at a constant distance from the plants or trees being sprayed. Distance sensors 45 may be provided, as shown schematically in FIG. 17, to detect the distance from each air outlet structure 100 to the plant or tree being sprayed, and distance information may be fed to a control device 46 to actuate the controllers 140 so that the angular alignment between air outlet structures may be accordingly adjusted to maintain a constant distance to the plants or trees during spraying. FIG. 17 shows only a few connections to control device 46. All of the distance sensors 45 and controllers 140 are preferably coupled to control device 46.

FIG. 15 shows the hinge or joint arrangement 130 for changing the angular position between two adjacent air outlet structures 100 in greater detail. The ends of each adjacent air outlet structure 100 are provided with respective plates 35 and 35', which are pivotally interconnected by an axle or pivot pin 36. Semicircular or arcuate slots 37 are provided in each pivotally connected plate 35, 35'. The plates 35, 35' and the respective air outlet structures 100 are held in a chosen angular position by means of a screw and nut 38 (similar to 12 and 13 of FIGS. 7 and 9) which is tightly closed on the slotted portions of the plates 35, 35'. The air outlet structures are firmly and tightly connected to the flexible duct 7 by means of flanges 3, as described above, and the flexible duct 7 follows the contour defined by the angularly arranged air outlet structure 100, which angular arrangement may be controlled either manually or automatically (by control device 46) to maintain the air outlet structures 100 at a substantially constant distance from the plants or trees being sprayed.

FIGS. 16 and 17 show the above-described spraying equipment mounted on an agricultural vehicle 39 which carries a blower 40 for pressurizing air, a main duct 41 connecting flexible ducts 7 to the blower 40, a container 42 for holding a plant treating liquid, a pump 43 for supplying the plant treating liquid to the spray nozzles 9, distance sensors 45 and controllers 140 each coupled to control device 46 for controlling the air outlet structures to be maintained at a constant distance from the plants or trees being sprayed, and controls 44 for regulating the supply of air and plant treating liquid in accordance with the requirements of the plants or trees being sprayed. The vehicle 39 travels along a row of plants or trees and sprays one plant or tree after another with turbulent pulsating air streams carrying the plant treating liquid in finely divided droplets.

The spraying equipment according to the present invention constitutes an improvement over the previous equipment in that it ejects turbulent pulsating air streams without requiring any moving parts. Rotatable components, such as the above described rotatable vane arrangement, which are rotated by the air streams themselves, can be added in order to control the rhythm of or enhance the strength of the pulsations of the air streams, but these are not absolutely necessary for the task of vehemently rotating and vibrating the plant leaves while applying a spray onto their both sides.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. Equipment for spraying plants and trees with a plant treating liquid injected into turbulent pulsating air streams, comprising:

at least one oblong air outlet structure having a plurality of air outlets (301, 302), said outlets being relatively positioned with respect to each other and dimensioned to issue air streams in divergent mutually interacting directions and thereby create whorls, turbulences and pulsations between each adjacent two air streams, said air outlet structure having an oblong air inlet opening receiving pressurized air, said air outlets being arranged next to each other and extending outwardly from said air inlet opening, said air outlets each having a respective axis which has an angle of inclination which differs with respect to the angle of inclination of an adjacent air outlet and thereby issuing the turbulent and pulsating air streams in said divergent directions; and at least one spray nozzle arranged to inject a plant treating liquid into the turbulent pulsating air streams issued from said air outlet structure.

2. The equipment for spraying plants and trees according to claim 1, further comprising:

a blower for pressurizing air;

an air duct coupled to said blower supplying pressurized air to said air inlet opening of said air outlet structure;

a pump for supplying plant treating liquid to said spray nozzle; and a controller for adjusting a flow of pressurized air from said blower and a flow of plant treating liquid from said pump in accordance with given requirements of plants and trees to be sprayed.

3. The equipment for spraying plants and trees according to claim 2, wherein said equipment for spraying plants and trees is mountable on an agricultural vehicle configured to travel along a row of plants or trees.

4. The equipment for spraying plants and trees according to claim 2, wherein said air duct comprises a flexible and airtight hose made of a thin and flexible plastic material.

5. The equipment for spraying plants and trees according to claim 2, wherein said air duct comprises a rigid airtight hose.

6. The equipment for spraying plants and trees according to claim 2, comprising a plurality of said air outlet structures connected to said air duct, and wherein said air duct comprises a flexible and airtight hose made of a thin and flexible plastic material for supplying pressurized air from said blower to respective air inlet openings of said plurality of air outlet structures connected thereto.

7. The equipment for spraying plants and trees according to claim 6, wherein adjacent air outlet structures of said plurality of air outlet structures are interconnected by a joint structure for enabling a position of each air outlet structure to be adjusted relative to an adjacent air outlet structure.

8. The equipment for spraying plants and trees according to claim 7, wherein said joint structure comprises:

a plate member attached to each of said air outlet structures;

slots in each of said plates and arranged in registration with each other;

a screw extending through said slots and clamping said plates together so as to maintain said plates and said two adjacent air outlet structures in a predesignated angular alignment; and wherein said air duct is flexible and bendable in accordance with the predesignated angular alignment.

9. The equipment for spraying plants and trees according to claim 7, further comprising a controller coupled to the air outlet structures for adjusting an angular alignment between adjacent air outlet structures so as to maintain said air outlet structures at a substantially constant distance from the plants or trees being sprayed.

10. The equipment for spraying plants and trees according to claim 9, wherein said controller comprises a hydraulic piston or an electrically powered linear actuator having two arms interconnecting adjacent air outlet structures.

11. The equipment for spraying plants and trees according to claim 2, wherein said air outlet structure comprises:
a rotatable vane arrangement for controlling a rhythm of and enhancing the strength of pulsations of the turbulent pulsating air streams issued from said air outlets of said air outlet structure, said rotatable vane arrangement being rotatably coupled to said air outlet structure in the vicinity of said air inlet opening, said rotatable vane arrangement having a length substantially co-extensive with said air inlet opening,
said rotatable vane arrangement including at least one rotatable vane helically wound or twisted around an axis of said rotatable vane arrangement, said axis of said rotatable vane arrangement being positioned essentially transversely to said inlet opening, and said rotatable vane arrangement being rotatable by the pressurized air supplied by said blower through said air duct to thereby at least partly open and close each of said plurality of air outlets in progression.

12. The equipment for spraying plants and trees according to claim 11, wherein said rotatable vane arrangement comprises at least two of said helically wound or twisted vanes.

13. The equipment for spraying plants and trees according to claim 11, wherein said air outlet structure comprises two parallel side walls extending into said duct and said rotatable vane arrangement is rotatably coupled between said two parallel side walls.

14. The equipment for spraying plants and trees according to claim 11, wherein said air outlet structure includes speed control means for friction controlling a rotating speed of said rotatable vane arrangement to limit the rotating speed to a predetermined maximum speed.

15. The equipment for spraying plants and trees according to claim 14, wherein said air outlet structure comprises:
a rotatable vane arrangement for controlling a rhythm of and enhancing the strength of pulsations of the turbulent pulsating air streams issued from said air outlets of said air outlet structure, said rotatable vane arrangement being rotatably coupled to said air outlet structure in the vicinity of said air inlet opening, said rotatable vane arrangement having a length substantially co-extensive with said air inlet opening, said rotatable vane arrangement including at least one rotatable vane helically wound or twisted around an axis of said rotatable vane arrangement said axis of said rotatable vane arrangement being positioned essentially transversely to said inlet opening, and said rotatable vane arrangement being rotatable by the pressurized air supplied by said blower through said air duct to thereby at least partly open and close each of said plurality of air outlets in progression.

16. The equipment for spraying plants and trees according to claim 1, wherein said air outlet structure further comprises a coupling means surrounding said air inlet opening and coupling said air inlet opening to an air duct.

17. The equipment for spraying plants and trees according to claim 1, wherein said air outlet structure comprises two longitudinal side walls extending outwardly from a region of said inlet opening, and partition walls extending laterally between said two longitudinal side walls to define said plurality of air outlets.

18. The equipment for spraying plants and trees according to claim 1, wherein said air outlet structure is coupled to an air duct by a flange and by a bracket extending along said air outlet structure, said air duct being clamped between said flange and said bracket.

19. The equipment for spraying plants and trees according to claim 18, wherein said air duct is clamped between said flange and said bracket by screws or rivets.

20. The equipment for spraying plants and trees according to claim 18, wherein said at least one spray nozzle is coupled to said bracket such that said spray nozzle is angularly and spatially adjustable to inject the plant treating liquid into the turbulent pulsating air streams issued from said air outlet structure.

21. Equipment for spraying plants and trees with a plant treating liquid injected into turbulent pulsating air streams, comprising:
at least one oblong air outlet structure for issuing turbulent pulsating air streams and for creating whorls turbulent pulsations between each adjacent two air streams due to progressively diverging directions of the adjacent air streams and diffuser action, said air outlet structure having an oblong air inlet opening for receiving pressurized air and including a plurality of longitudinally arranged air outlets extending outwardly from said air inlet opening, said air outlets each having respective axes which are progressively endwardly inclined with respect to adjacent air outlets, and said air outlets each having a cross section which increases extending outwardly from said air inlet opening; and
at least one spray nozzle arranged to inject a plant treating liquid into the turbulent pulsating air streams issued from said air outlet structure.

22. The equipment for spraying plants and trees according to claim 21, wherein said air outlet structure further comprises:
a flange surrounding said air inlet opening and coupling said air inlet opening to an air duct;
two longitudinal side walls extending outwardly from said flange; and
partition walls extending laterally between said two longitudinal side walls to define said plurality of air outlets.

23. The equipment for spraying plants and trees according to claim 22, wherein said partition walls include a central partition wall arranged substantially perpendicular to said two longitudinal side walls and substantially perpendicular to a longitudinal base of said air outlet structure, and successive lateral partition walls on each side of said central partition wall are progressively inclined from said central partition wall at decreasing angles relative to said base of said air outlet structure.

24. The equipment for spraying plants and trees according to claim 23, wherein said successive lateral partition walls are progressively inclined from said central partition at angles decreasing by increments of about 10 degrees.

25. The equipment for spraying plants and trees according to claim 23, wherein said partition walls include a single upright central partition wall perpendicular to said two longitudinal side walls, and three successive lateral partition walls on each side of the single central partition wall which are progressively inclined from said central partition wall at decreasing angles of about 10, 20 and 30 degrees, respectively.

26. The equipment for spraying plants and trees according to claim 22, wherein said partition walls include a single central partition wall perpendicular to said two longitudinal side walls, and three successive lateral partition walls on each side of the single central partition wall which are progressively inclined from said central partition wall at decreasing angles in a range of from 1–20 degrees, 6–30 degrees, and 15–45 degrees, respectively.

27. The equipment for spraying plants and trees according to claim 22, wherein said air outlets are further defined by pairs of longitudinal side wall portions extending outwardly from said flange, and partition walls extending laterally between said pairs of longitudinal side wall portions to separate each adjacent air outlet, said pairs of longitudinal side wall portions of each adjacent air outlet being alternately inclined in opposite directions to form air outlets which are both endwardly inclined and sidewardly inclined.

28. The equipment for spraying plants and trees according to claim 27, wherein a sideward angle of inclination of one of the longitudinal sidewall portions of a given pair of longitudinal sidewall portions differs from a sideward angle of inclination of the other of the longitudinal sidewall of inclination portions of said given pair of longitudinal side wall portions.

29. The equipment for spraying plants and trees according to claim 21, further comprising:
    a blower for pressurizing air;
    an air duct coupled to said blower for supplying pressurized air to said air inlet opening of said air outlet structure;
    a pump for supplying plant treating liquid to said spray nozzle;
    a flow controller for adjusting a flow of pressurized air from said blower and a flow of plant treating liquid from said pump in accordance with given requirements of plants or trees being sprayed;
    a non-contacting distance sensor for detecting a spacing of said air outlet structure from the plants or trees being sprayed; and
    a controller coupled to said non-contacting distance sensor and to said air outlet structure for adjusting the position of said air outlet structure so as to maintain said air outlet structure at the constant spacing from the plants or trees being sprayed.

30. Equipment for spraying plants and trees with a plant treating liquid injected into turbulent pulsating air streams, comprising:
    at least one oblong air outlet structure for issuing turbulent pulsating air streams in diverging directions, said air outlet structure having an oblong air inlet opening for receiving pressurized air and including a plurality of air outlets extending outwardly from said air inlet opening and located adjacent to each other,
    said air outlets each having a respective axis positioned at an angle of inclination, which angle of inclination of any air outlet differs with respect to the angle of inclination of an adjacent air outlet;
    wherein said air outlet structure further comprises two longitudinal side walls extending outwardly from a region of the inlet opening, and partition walls extending laterally between said two longitudinal side walls to define said plurality of air outlets; and
    at least one spray nozzle arranged to inject a plant treating liquid into the turbulent pulsating air streams issued from said air outlet structure.

31. The equipment of claim 30 wherein the air inlet opening includes an air duct coupling.

32. The equipment of claim 30, wherein said partition walls include a central partition wall arranged substantially perpendicular to said two longitudinal side walls and substantially perpendicular to a longitudinal base of said air outlet structure, and successive lateral partition walls on each side of said central partition wall, which are progressively inclined from said central partition wall at decreasing angles relative to said base of said air outlet structure.

33. The equipment of claim 32 wherein said successive lateral partition walls are progressively inclined from said central partition at angles decreasing by increments of about 10 degrees.

34. The equipment of claim 32, wherein said partition walls include three successive lateral partition walls on each side of the single central partition wall which are progressively inclined from said central partition wall at decreasing angles of about 10, 20 and 30 degrees, respectively.

35. The equipment of claim 30, wherein said partition walls include a single central partition wall perpendicular to said two longitudinal side walls, and three successive lateral partition walls on each side of the single central partition wall which are progressively inclined from said central partition wall at decreasing angles in a range of from 1–20 degrees, 6–30 degrees, and 15–45 degrees, respectively.

36. The equipment of claim 30, wherein said air outlets are further defined by pairs of longitudinal side wall portions extending outwardly from said region of the inlet and partition walls extending laterally between said pairs of longitudinal side wall portions to separate each adjacent air outlet, said pairs of longitudinal side wall portions of each adjacent air outlet being alternately inclined in opposite directions to form air outlets which are both endwardly inclined and sidewardly inclined.

37. The equipment of claim 36, wherein a sideward angle of inclination of one of the longitudinal sidewall portions of a given pair of longitudinal sidewall portions differs from a sideward angle of inclination of the other of the longitudinal sidewall portions of said given pair of longitudinal side wall portions.

38. Equipment for spraying plants and trees with a plant treating liquid injected into turbulent pulsating air streams, comprising:
    a plurality of oblong air outlet structures issuing turbulent pulsating air streams in diverging directions, each said air outlet structures having an oblong air inlet opening for receiving pressurized air and including a plurality of air outlets positioned along the oblong dimension of said structures and extending outwardly from said air inlet opening,
    said air outlets each having a respective axis positioned at an angle of inclination which angle of inclination of any one outlet differs with respect to the angle of inclination of an adjacent air outlet;
    at least one spray nozzle arranged to inject a plant treating liquid into the turbulent pulsating air streams issued from at least one of said air outlet structures;
    a blower for pressurizing air;
    an air duct coupled to said blower for supplying pressurized air to said air inlet opening of at least one of said air outlet structures;
    a pump for supplying plant treating liquid to said at least one spray nozzle;
    a controller for adjusting flow of pressurized air from said blower and a flow of plant treating liquid from said pump in accordance with requirements of plants and trees to be sprayed;
    said plurality of said air outlet structures being connected to said air duct,
    said air duct comprises a flexible and airtight hose made of a thin and flexible plastic material for supplying pressurized air from said blower to respective air inlet openings of said plurality of air outlet structures connected therewith;

and wherein adjacent air outlet structures of said plurality of air outlet structures are interconnected by a joint structure for enabling a position of each air outlet structure to be adjusted relative to an adjacent air outlet structure;

said joint structure comprises:

a plate member attached to each of said air outlet structures;

openings in each of said plates and arranged in registration with each other;

a clamping means extending through said openings and clamping said plates together so as to maintain said plates and said two adjacent air outlet structures in a predesignated angular alignment; and wherein said air duct is flexible and bendable in accordance with the predesignated angular alignment.

* * * * *

UNITED STATES PATENT AND TRADEMARK OFFICE
CERTIFICATE OF CORRECTION

PATENT NO. : 5,740,962
DATED     : April 21, 1998
INVENTOR(S): MANOR et al

It is certified that error appears in the above-identified patent and that said Letters Patent is hereby corrected as shown below:

```
Title Page, left column, U.S. PATENT DOCUMENTS, below
5,251,818, insert
--2,590,400    3/1952   Gollnick ......... 239/166
  2,608,792    9/1952   Chater ........... 239/77
  3,683,547    8/1972   Harden ........... 239/146
  4,893,755    1/1990   Keathley ......... 239/172
  4,439,948    4/1984   Brown et al ...... 239/159
  4,927,080    5/1990   Alsing ........... 239/77
  5,028,002    7/1991   Whitford ......... 239/77
  5,228,621    7/1993   Wilson et al ..... 239/172
  5,246,164    9/1993   McCann et al ..... 239/73
  5,469,653   11/1995   Roehrick ......... 239/77--.
```

Signed and Sealed this

Thirtieth Day of November, 1999

Attest:

Q. TODD DICKINSON

*Attesting Officer*   *Acting Commissioner of Patents and Trademarks*